United States Patent [19]

Biber et al.

[11] 4,238,154
[45] Dec. 9, 1980

[54] CAMERA HAVING TOO CLOSE/TOO FAR INDICATION

[75] Inventors: Conrad H. Biber, Needham; Edwin K. Shenk, Westford, both of Mass.

[73] Assignee: Polaroid Corporation, Cambridge, Mass.

[21] Appl. No.: 65,263

[22] Filed: Aug. 9, 1979

Related U.S. Application Data

[63] Continuation of Ser. No. 899,962, Apr. 25, 1978, abandoned.

[51] Int. Cl.³ .............................................. G03B 3/10
[52] U.S. Cl. .................................................. 354/198
[58] Field of Search .................. 354/25, 195, 198; 352/140; 355/56

[56] References Cited

U.S. PATENT DOCUMENTS

| | | | |
|---|---|---|---|
| 3,171,337 | 3/1965 | Fischer | 354/34 |
| 3,273,478 | 9/1966 | Kinder | 354/128 |
| 3,406,620 | 10/1968 | Hochreiter et al. | 354/33 |
| 3,442,193 | 5/1969 | Pagel | 354/25 |
| 3,620,144 | 11/1971 | Hayashi | 354/289 |
| 3,678,828 | 7/1972 | Mashimo et al. | 354/22 |
| 3,886,567 | 5/1975 | Matsumoto et al. | 354/25 |
| 4,010,479 | 3/1977 | Nohusawa | 354/25 |
| 4,032,934 | 6/1977 | Henrickson et al. | 354/25 |

Primary Examiner—Michael L. Gellner
Attorney, Agent, or Firm—David R. Thornton

[57] ABSTRACT

An automatic focusing camera having an indicator for producing an indication when the subject being photographed is too near the camera to be brought into focus. It also provides an inhibit signal if this situation exists thereby precluding operation of an exposure cycle. When the camera is operated in its flash mode, an indicator produces its indication if the subject is outside a predetermined range within which the shutter mechanism is capable of producing a properly exposed photograph under flash illumination and an inhibit signal is also provided in this situation to thereby preclude operation of an exposure cycle.

20 Claims, 10 Drawing Figures

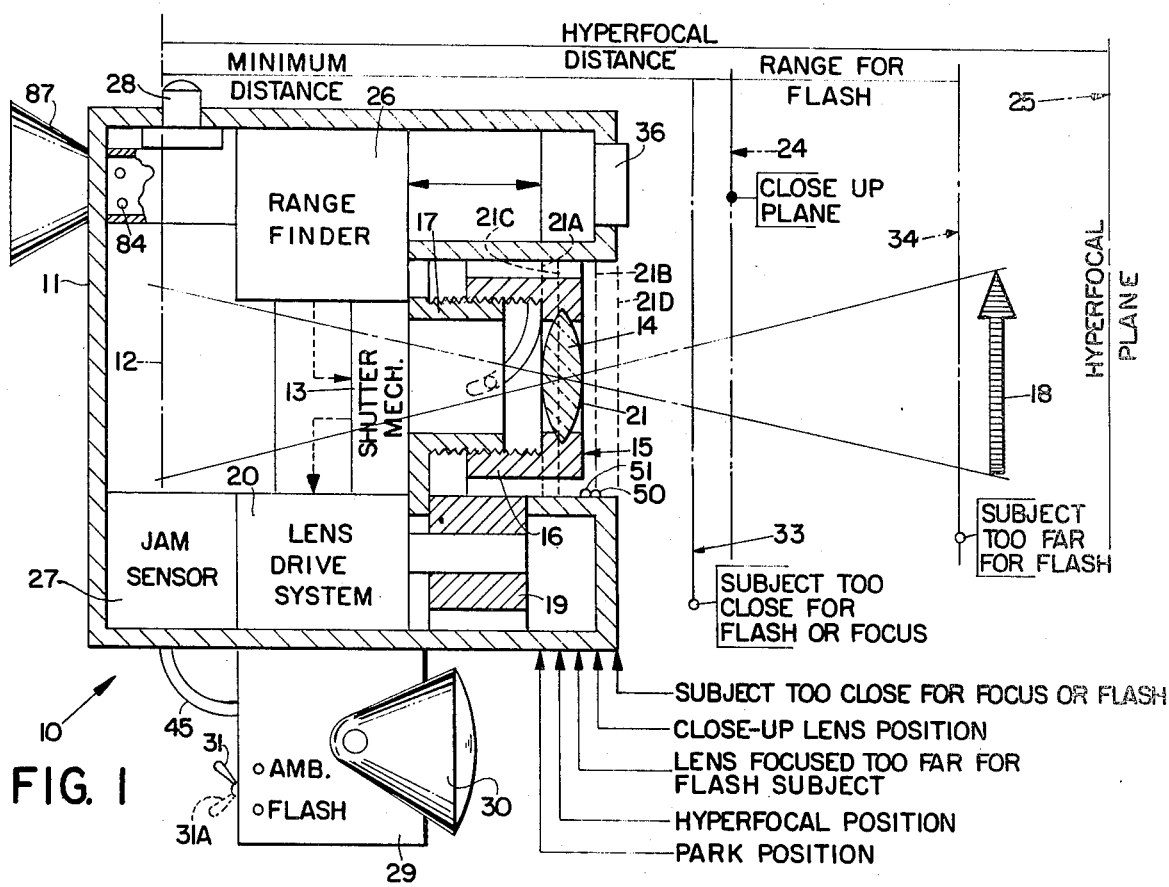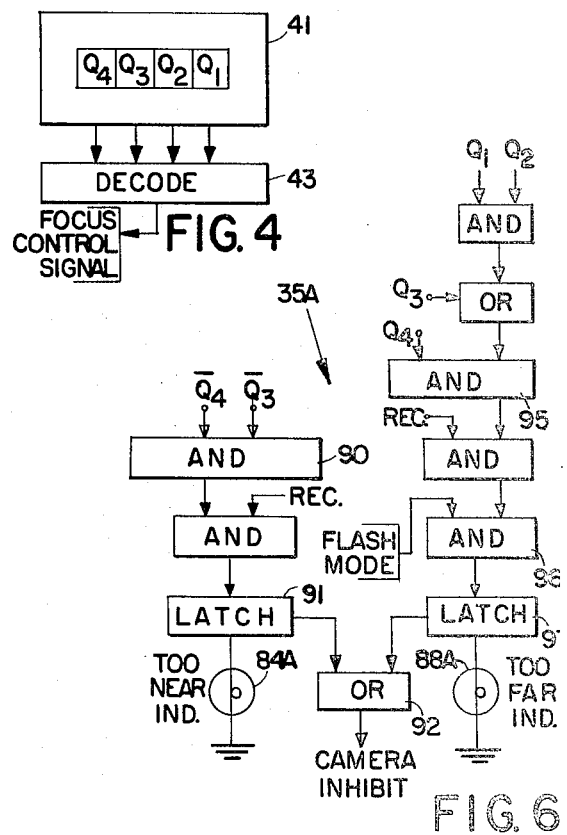

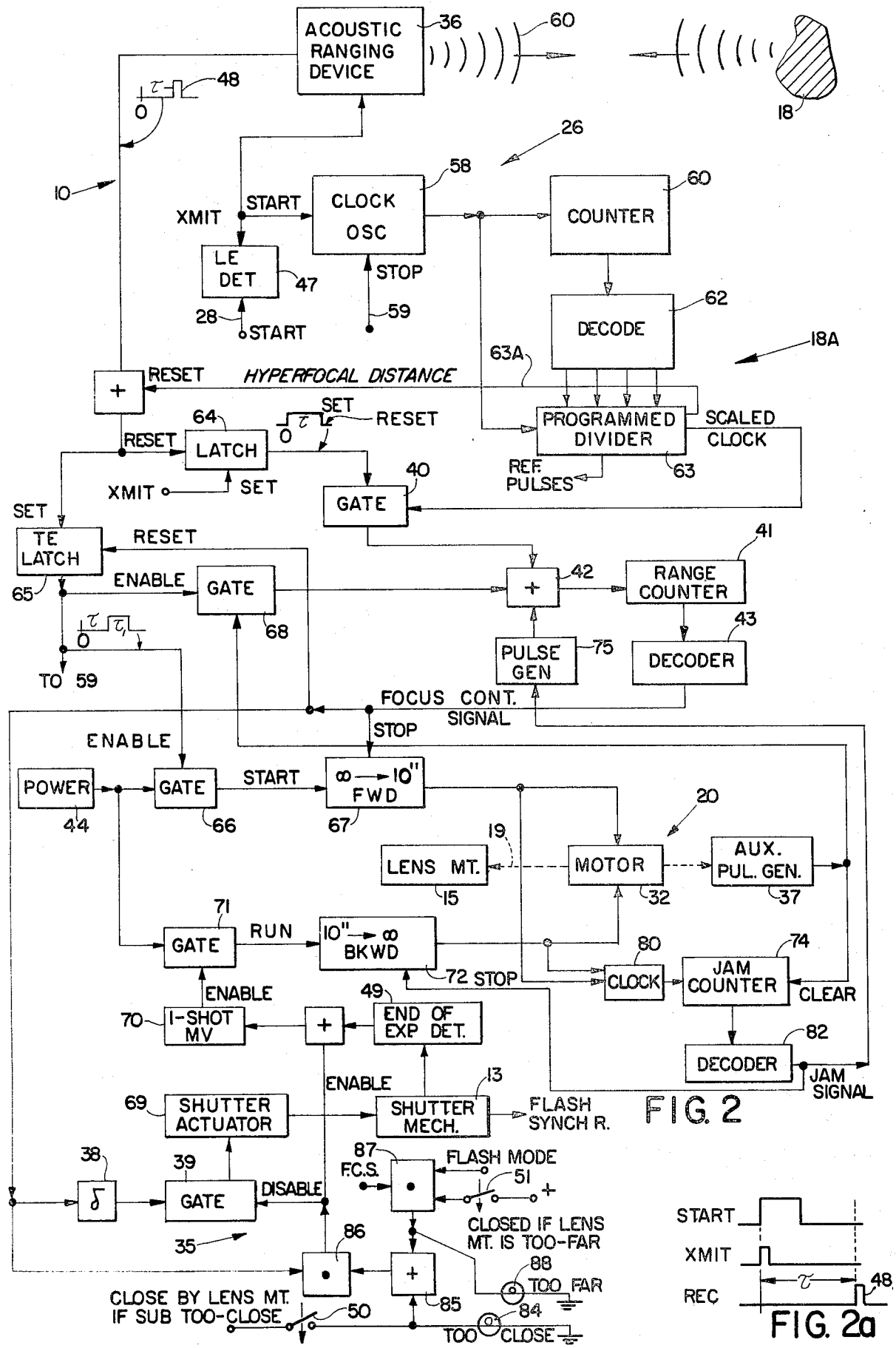

CAMERA HAVING TOO CLOSE/TOO FAR INDICATION

This is a continuation of application Ser. No. 899,962, filed Apr. 25, 1978, now abandoned.

BACKGROUND OF THE INVENTION

This invention relates to an automatic focusing camera which, without a-priori knowledge of the distance of a subject to the camera, is capable of bringing the subject into focus in response to initiation of a camera cycle.

An automatic focusing camera is disclosed in U.S. patent application Ser. No. 729,289, filed Oct. 4, 1976, the disclosure of which is hereby incorporated by reference. In this camera, which is referred to hereafter as a camera of the type described, initiation of a camera cycle causes the lens mount of an adjustable lens assembly to be driven from a park position to a focus position dependent on subject distance as determined by a range finder system that generates a range parameter related to subject distance. When an exposure cycle in such a camera is initiated, the range finder system beams a burst of ultrasonic energy toward the subject. The interval of time between transmission of the burst and receipt of an echo is a parameter linearly related to subject distance by a fixed scale factor which defines a parametric relationship between time and the lens/subject function of the camera.

As is well known, the lens/subject function establishes the relationship between the distance of a subject and the position of the lens mount on the camera at which an image of the subject at that distance is in focus on the focal plane of the camera. Such function also establishes the range of distances over which subjects can be brought into focus by moving the lens mount.

Once the range parameter is generated, a motor moves the lens mount from a park position to a focus position depending on subject distance as determined by the range parameter, the shutter mechanism of the camera then being actuated to effect exposure of film located in a focal plane at a recording station behind the shutter mechanism. Sensing of the termination of exposure causes the motor to drive the lens mount back to its park position thereby terminating the exposure cycle.

When a photoelectrically controlled shutter mechanism is incorporated into a camera of the type described, it would appear that proper exposure as well as focus will be obtained each time an exposure cycle is initiated without a-priori knowledge of either light conditions of the scene being photographed or subject distance. This is not the case, however, when an attempt is made to photograph a subject located closer to the camera than the minimum distance designed into the optical system of the lens mount, or when an attempt is made to photograph a subject under flash illumination conditions and the subject is outside a predetermined range of distances dependent on the range of exposure values of the shutter mechanism and the light output of the flash unit. Under ambient lighting conditions, a poorly focused photograph will result when a subject is closer than a minimum distance. Under flash illumination conditions, an overexposed photograph will result when a subject is closer than the minimum predetermined range, and an underexposed photograph will result when the subject is further than the maximum predetermined range.

It is therefore an object of the present invention to provide a new and improved camera for controlling camera operation in accordance with subject distance.

A further object is to provide a camera capable of indication of operable limits of the camera versus subject distance under both ambient and flash mode conditions.

BRIEF DESCRIPTION OF THE INVENTION

In accordance with the present invention, an indicator associated with an automatic focusing camera is responsive to initiation of a camera cycle for producing an indication and for inhibiting further camera operation if the subject is too near the camera to be in focus or too near or too far for proper flash exposure. Under the above conditions, a camera inhibit signal is produced which is effective to terminate the camera cycle without actuating the shutter mechanism. When the camera is operated in its flash mode, and the subject is outside a predetermined range within which the shutter mechanism is capable of producing a properly exposed photograph, the indicator provides an indication that the subject is either too near or too far from the camera for proper flash exposure to be achieved. In this case, a camera inhibit signal is also produced, such signal terminating camera operation without permitting the shutter mechanism to be actuated.

In one embodiment of the invention, the indication and inhibit signal are provided in response to movement of the lens mount toward or to a focus position, as determined by a range parameter, which is outside the lens position permitted under the described conditions. Then the inhibit signal causes the lens mount to be returned to its start position without actuating the shutter thereby terminating the camera cycle.

In another embodiment of the invention, digital or analog logic is utilized in connection with generation of the range parameter to provide indication and inhibit signals. This arrangement permits the camera cycle to be terminated without moving the lens mount from its park position.

BRIEF DESCRIPTION OF THE DRAWINGS

Embodiments of the present invention are disclosed in the accompanying drawings wherein:

FIG. 1 is a schematic block diagram of an autofocus camera of the type described showing the various positions of its lens mount in relation to the too-close and too-far positions of a subject;

FIG. 2 is a block diagram of the camera of FIG. 1 illustrating its ranging and focusing arrangement in accordance with the present invention;

FIG. 2A is a timing diagram associated with the block diagram of FIG. 2;

FIG. 4 is a schematic showing of the range counter and decoder shown in FIG. 3;

FIG. 5 is a chart showing the relationship between the stored count of the range counter and the distance of the subject to the camera;

FIG. 6 is a detailed logic diagram of the indicator and inhibitor arrangements of FIG. 3;

DETAILED DESCRIPTION

Figure 3:
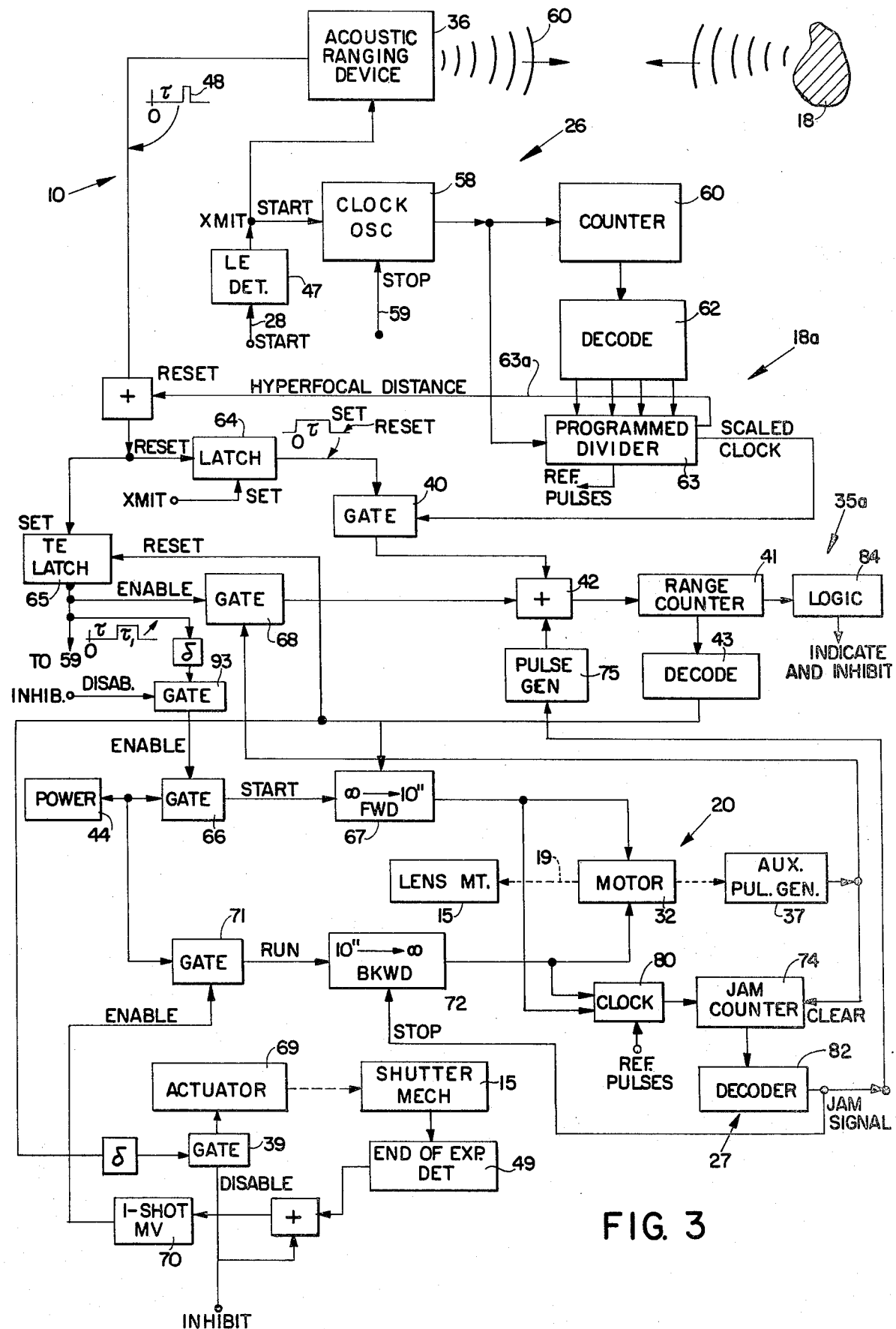
FIG. 3 is a block diagram of the second embodiment of the present invention.

Referring now to FIG. 1, reference numeral 10 pertains to an automatic focus camera of the type disclosed in the application identified above and comprises a housing 11 containing a focal plane 12 defining a recording station located behind a shutter mechanism 13 which may be associated with a photodetector (not shown) for sensing the amount of light passing the shutter mechanism when the latter is actuated. A sheet of photosensitive material (not shown) is located in the focal plane for receiving light from a scene being photographed when the shutter mechanism is actuated. A lens 14 is carried on one axial end of an adjustable lens mount 15 having a sleeve member 16 carrying on its opposite axial end internal threads that enage a threaded tube 17 on the camera housing permitting rotation of the lens mount to impart axial displacement of the lens 14.

Given the type of lens, its focal length, and other parameters of the optical system, the lens mount will have a given lens/subject function which relates the axial position of a lens mount at which a subject 18 is in focus to the distance of the subject to the focal plane. In order to adjust the axial position of the lens mount, pinion 19 is provided. The teeth of this pinion engage the toothed periphery of lens mount 15 so that rotation of pinion 19 by a drive means 20, i.e., an electric motor and forward and backward controls, imparts rotation to the lens mount. Rotation of the pinion in one direction (i.e., clockwise) rotates the lens mount counterclockwise and moves it to the right as seen in FIG. 1, from its park position closest to the housing to a close-up position. In the park position of the lens mount 15, the front face 21 will occupy the position shown by line 21A. Line 21B shows the position of face 21 when the lens mount is in its close-up position.

If desired, movement of the lens mount can be limited in the one direction to its close-up position. In such case, a stop would be formed by the closed end (shown dotted) of slot 22 in the inner surface of sleeve 17 which cooperates with a fixed pin 23, fixed to tube 17 and projecting into the slot. Rotation of the pinion in the opposite direction (i.e., counterclockwise) would move the lens mount in the opposite direction and return it to its park position where it abuts housing 11 which limits further travel in the opposite direction.

When the lensmount is in close-up position 21B, subject 18 will be in focus when it is located in close-up plane 24 at some minimum distance, the absolute value of which is dependent on the lens/subject function as well as the mechanics of the lens mount selected by the camera designer. With the lens mount at the hyperfocal position 21C, subject 18 will be in focus when it is located in the hyperfocal plane 25 or beyond. Thus, an image of a subject located within the subject range defined between planes 24, 25 shown in FIG. 1 can be focused on the focal plane of the camera by selecting the position of the lens mount as prescribed by the lens/subject function within the limits of the close-up and hyperfocal positions of the lens mount. A subject closer to the camera than the minimum distance cannot be brought into focus since the lens mount cannot be moved beyond its close-up position to the position indicated at 21D.

Camera 10 also includes a range finder means 26 having an acoustic ranging device 36 and a jam sensor 27 actuated by an actuator button 28. On manual depression of the actuator button, a switch (not shown) is closed and a cycle of the camera is initiated whereby range finder means 26 generates a range parameter directly related to subject distance and computes, from such parameter, a number representing the focus position of the lens mount in accordance with the lens/subject function. Such number also represents the distance of the subject from the camera.

Drive means 20 is responsive to the number computed by the range finder means, and drives the lens mount 15 from its park position to its focus position by suitable rotation of pinion 19. Upon arrival of the lens mount at its focus position, a shutter mechanism 13 is actuated to effect exposure of a photosensitive sheet (not shown) lying in the film plane 12. The shutter mechanism 13 then signals completion of exposure, and the drive means responds by driving the lens mount 15 back to its park position thereby terminating the camera cycle.

The above-described operation of camera 10 permits photographing of a subject without a-priori knowledge of subject distance by reason of the focusing arrangement described above. Only when the subject being photographed is closer to the camera than the minimum distance associated with the camera will an improperly focused picture be obtained.

Where ambient scene lighting conditions are low such that improper exposure will result unless a time exposure is made, the camera can be switched from an ambient mode of operation to a flash mode of operation. Such switching can be accomplished by the attachment of a flash accessory; however, for simplicity of the present description, the camera 10 is illustrated herein with an affixed flash assembly or flash unit 29 for the purpose of illuminating subject 18 with the output of a flash lamp or strobe 30 when switch 31 is moved from an ambient to a flash position; the latter being indicated by broken lines 31A. Lead 45 interconnecting the flash unit 29 with the camera provides for synchronization of the flash energization with the movement of shutter mechanism 13 in a conventional manner.

Since camera exposure systems do not provide an unlimited range of exposure values (available combinations of diaphragm size and exposure intervals) there is a minimum and a maximum exposure value associated therewith which are important considerations for flash photography where the flash energy is fixed. Consequently, proper flash exposure can be achieved only with a limited range of subject distances. For instance, if the minimum exposure value is designed to produce a proper exposure when the subject is located at the plane 24, an exposure of a subject located at still nearer the camera, i.e., in plane 33, will be overexposed while subjects at far distances will be underexposed. Although they are often different, the close-up distance (plane 24) which defines the minimum distance of a subject at which focus can be achieved is treated herein as the same minimum distance at which flash illumination will properly expose the subject. Additionally, for reference purposes, plane 34 has herein been selected to designate the maximum distance of a subject under flash illumination at which the subject will be properly exposed. Thus, the distance between planes 24 and 34 represents the flash illumination range within which the subject will be properly exposed. Therefore, utilization of camera 10 in its flash mode of operation without a-priori knowledge of the distance of the subject will result in proper exposure only for subjects located between planes 24 and 34.

In order to obtain properly focused photographs under ambient lighting conditions, independently of the distance of the subject to the camera, and in order to obtain properly exposed photographs under flash illumination conditions without a-priori knowledge of the subject distance, the present invention incorporates into an automatic focusing camera an indicator and/or camera inhibitor operative if the subject is too close for proper focusing or outside the range for proper exposure under flash illumination conditions, so as to warn the operator of the existence of these situations and prevent further camera operation.

In the embodiment shown in FIGS. 1 and 2, indicator 35 operates in response to mechanically sensing the position of the lens mount after it is driven to its focus position by the range finder means while in the embodiment of FIG. 3, indicator 35A operates in response to the output of the range finder system before movement of the lens mount occurs. In both embodiments, the indicator is responsive to initiation of a camera cycle for producing an indication when the subject is too near for proper focusing or outside the range (too near or too far) for proper exposure if the camera is operated in its flash mode. An inhibit signal is also produced, and is effective to terminate the camera cycle without actuating the shutter mechanism.

The camera apparatus illustrated herein are described with respect to a single camera cycle including ranging, focusing and exposure; however, it should be noted that it is often preferable to provide means for cycling the camera only through ranging and focusing. In the latter case, however, the novel indicating arrangements will still operate in the manner to be described.

Referring now to FIG. 2, a block diagram is shown which is similar to the block diagram shown in FIG. 10 of the application identified above. The operation of the block diagram in FIG. 2 is described below in connection with two situations:

(1) ambient light operation with the subject located at a distance greater than the minimum distance, or flash illumination operation where the subject is located within a predetermined subject range that provides proper exposure under flash illumination; and (2) ambient light operation when the subject is located at a distance less than the minimum distance, and flash illumination operation when the subject is located outside the predetermined range that provides proper exposure.

The first situation represents the normal mode of operation of the device shown in the above-noted copending patent application and is described below for the sake of completeness.

A camera cycle is initiated by manual actuation of the camera cycle button 28 (shown schematically in FIG. 2) which powers the camera from an electrical source or supply 44 and actuates the range finder 26 by establishing a step function whose leading edge is detected at 47 and used to key acoustic ranging device 36, as well as to start the operation of a clock 58. Ranging device 36 transmits a burst of ultrasonic energy 60 which is beamed at subject 18. Energy reflected from the subject will be received by the acoustic ranging device 36 and cause the latter to produce a RECEIVE or range pulse 48 at a time $\tau$ following transmission (see FIG. 2A).

During this interval, clock 58 produces a periodic train of pulses which increment a counter 60 while a decoder 62 serves to decode the contents of counter 60 to produce the break points of an approximation of the lens/subject function as described in the above-identified patent application. A programmed divider 63, responsive to the output of decoder 62, functions as a scaled clock whose pulse repetition frequency varies in accordance with the approximation of the lens/subject function which, itself is parametrically related to time in accordance with the relationship between the interval $\tau$ and subject distance. The output of divider 63 is applied through an AND gate 40 and an OR gate 42 to a range counter 41.

A latch 64, initially set by the transmit signal, is reset upon receipt of pulse 48. Thus, the output of latch 64 is a pulse of duration $\tau$ and hence, gate 40 is enabled by latch 64 only during the time between the start of transmission from acoustic ranging device 36 and receipt of an echo by this device.

At the instant transmission of an ultrasonic burst occurs, the scaled clock is gated into a range counter 41. In the interval of time between start of transmission and the earliest time the receiver is capable of detecting an echo (taking into account the transmission time of the burst and the blanking time of the receiver to prepare it for receipt of an echo), the scaled clock will have produced $p_1$ pulses where $p_1$ is a number representing both the close-up position of the lens mount and the minimum distance of the camera (see FIG. 1). The scaled clock continues to run producing pulses at a rate determined by the program of divider 63 so that when echo pulse 48 occurs and gate 40 closes, the contents of counter 41 will be p, where p is a number representing both the focus position of the lens mount and the distance of the subject from the camera. As explained below, the maximum number that can be inserted into counter 41 by the scaled clock is $p_2$, where $p_2 > p > p_1$, and $p_2$ is a number representing the hyperfocal position of the lens mount.

Initially, the lens mount is located at its park position with which the number $p_3$ is associated, where $p_3 > p_2$. To reach its focus position represented by the number p (stored in the range counter 41) the lens mount must be displaced a distance proportional to $p_3 - p$. This result is achieved by a decoder 43 which produces a focus control signal when the contents of the range counter 41 reaches the number $p_3$, the range counter being incremented from its value p by displacement of the lens mount as described below.

In addition to closing gate 40 and terminating the incrementing of counter 41 by the scaled clock, echo pulse 48 also sets trailing edge latch 65 which enables AND gate 68 and AND gate 66. Enablement of gate 66 applies power to motor 32 of drive means 20 through forward motor control 67 while gate 68 permits conduction to gate 42 and range counter 41 of lens position pulses. Power from supply 44 is thus applied to forward motor control 67 which is effective to energize motor 32 operatively connected to lens mount 15 through pinion 19. Motor 32 moves the lens mount and thereby operates auxiliary pulse generator 35 whose details are shown in the above-identified application. Auxiliary pulse generator 37 thus produces pulses only when motor 32 moves the lens mount, the rate at which pulses are produced being dependent upon the rate at which the motor moves the lens mount; the accumulated number of pulses created thereby being proportional to the distance moved by the lens mount. These pulses are applied to counter 41 through gate 68 (which is enabled by the setting of latch 65 upon receipt of echo pulse 48) and OR gate 42.

Thus, the contents of counter 41 increases from p (a number representing the focus position of the lens mount) towards a full-up condition, i.e., the number $p_3$. When the contents of counter 41 reaches $p_3$, decoder 43 produces a focus control signal which resets the latch 65 thereby opening gate 66 so as to disable forward motor control 67, thereby deenergizing motor 32 and further lens movement. In addition, the focus control signal produced by decoder 43 is applied via delay 38 and normally open gate 39, to shutter actuator 69 which actuates shutter mechanism 13 thereby exposing the film located at focal plane 12 of the camera. A jam sensor 27 comprising a clock 80, a jam counter 74 and a decoder 82, operate to fill up the range counter 41 and hence force a focus control signal when a mechanical jam occurs.

If the camera is being operated in its ambient illumination mode, switch 31 will have the position shown in solin lines in FIG. 1 and operation of flash unit 29 will be suppressed. If the camera is being operated in its flash illumination mode, switch 31 will be in position 31A thereby synchronizing the triggering of flash device 30 with shutter actuation in a conventional manner. In either case, exposure will be controlled by a photocell (not shown) which, in a conventional manner, integrates the light incident on the film due to actuation of the shutter mechanism, and terminates exposure when a predetermined amount of light has been received by the film.

Completion of exposure is detected at 49 thereby triggering one shot multivibrator 70 which produces a voltage for a predetermined period of time enabling gate 71 for this period and permitting power from supply 44 to be applied to backward motor control 72 which is effective to power motor 32 in the direction opposite to the direction in which control 67 powered the motor; and the motor will thus drive lens mount 15 from its focus position back to its park position. A clutch (not shown) prevents burn out of the motor when the lens reaches its park position prior to end of the time period set by the multivibrator 70. Alternatively, a lens switch (not shown) may be employed to shed the power load when the lens reaches this position.

A camera cycle has thus been completed, such cycle starting with manual actuation of the camera button when the lens mount is in its park position, and including movement of the lens mount to its focus position, completion of exposure, and movement of the lens mount back again to its park position.

When the camera is operated in its ambient illumination mode, and the subject is located at a distance from the lens mount greater than the hyperfocal distance, the scaled clock will reach the number $p_2$, corresponding to the hyperfocal distance (approximately 7 meters), before range pulse 48 occurs and before it can reset latch 64. As a consequence, when the count of divider 63 reaches the hyperfocal distance before pulse 48 occurs, the divider produces a signal in line 63A which is applied to latch 64 resetting the same. In such case, range counter 41 will contain the number $p_2$ corresponding to the hyperfocal position of the lens mount; and the setting of latch 65 is effective to enable motor 32 which operates to drive the lens mount from its park position to the hyperfocal position. It can be seen, therefore, that a subject at a distance in excess of the hyperfocal distance of the camera will be in focus because the lens mount will move to its hyperfocal position.

Indicator 35 becomes effective when the second situation outlined above occurs, namely, when camera operation is set for ambient light and the subject is located at a distance less than the minimum distance, as well as when the camera is set for flash illumination operation and the subject is located outside the range of flash. Assume first that a camera cycle is initiated when the camera is set for ambient light operation and the subject lies in plane 33 (i.e., too close for focusing). In such case, motor 32 is effective to drive lens mount 15 from its park position to the position shown at 21D in FIG. 1 wherein the lens mount closes normally open switch 50 located in the recess within which the lens mount is slidable. The closure of this switch occurs as soon as the lens mount passes its position 21B, and in any event prior to the time that the focus control signal is applied to the shutter actuator 69, a delay 38 insures this situation.

The closure of switch 50 powers indicator lamp 84 and sends a signal through OR gate 85 to AND gate 86. Simultaneously present at the other input to AND gate 86 is the "focus control signal" which causes the AND gate to produce an output signal that disables gate 39 and triggers one-shot multivibrator 70. The disabling of gate 39 prevents the focus control signal, after it has been delayed at 38, from passing to shutter actuator 69. Thus, it can be seen that the movement of the lens mount beyond position 21B (FIG. 1) in accordance with the operation of range finder means 26 will inhibit actuation of the shutter mechanism, and at the same time enable multivibrator 70 which will drive the lens mount back to its park position to terminate the exposure cycle. Furthermore, the user is advised of this "too close" condition by reason of the illumination of lamp 84 which may be in the form of a light emitting diode 84 positioned in viewfinder 87 of the camera, as shown in FIG. 1. Thus, when an attempt is made to photograph a subject under ambient light where the subject is located closer to the camera than the minimum distance for which the optical system of the camera has been designed, indicator 35 provides an indication of this situation and also provides an inhibit signal that terminates the exposure cycle without allowing the shutter mechanism to be actuated. In addition, the inhibit signal causes the lens mount to be driven back to its park position.

In the event that the camera is operated in its flash mode (i.e., switch 31 is in position 31A) and the subject is located at, say plane 33 (i.e., too close for proper exposure under flash illumination), indicator 35 is also effective to inhibit exposure. As described above, the initiation of a camera cycle will cause motor 32 to drive the lens mount from its park position to position 21D (FIG. 1), thereby again closing switch 50. Indicator 35 reacts in exactly the same way as described above to inhibit exposure the terminate the exposure cycle.

In the event that the camera is operated in its flash mode and the subject is located beyond plane 34 (i.e., too far for proper exposure under flash conditions), initiation of an exposure cycle will cause motor 32 to drive the lens mount from its park position to its position shown in full lines in FIG. 1. In such position, the lens mount will clear and thereby release the normally closed switch 51 located in housing 11 and engageable by the lens mount only when the latter is in a focus position for subjects located closer to the camera than the maximum distance for flash illumination represented by plane 34. Therefore, for a subject located beyond plane 34, the lens mount will be clear of switch 51 which becomes closed once the lens mount has been driven to its too far position.

Referring to FIG. 2, it can be seen that when the focus control signal occurs, all of the inputs to AND gate 87 will exist simultaneously and this gate will have an output produced by decoder 43. The output of AND gate 87 will illuminate lamp 88 (also positioned in viewfinder 87) indicating that the subject is beyond the maximum distance for which a flash picture can be taken. In addition, the output of AND gate 87 will pass through OR gate 85 and be applied to AND gate 86 which will produce an inhibit signal that will disable gate 39 and prevent the delayed focus control signal from operating actuator 69. In addition, the inhibit signal will be applied to multivibrator 70 for the purpose of causing motor 32 to drive the lens mount back to its park position thereby terminating the exposure cycle without allowing the shutter mechanism to be actuated.

Indicator 35 shown in FIG. 2 is thus effective only after the lens mount has been moved from its park to its focus position. The decision to terminate the exposure cycle without effecting shutter actuation is made on the basis of the focus position of the lens mount. Switching arrangements other than that shown in the drawing can be utilized for sensing the focus position of the lens mount and producing the indications and inhibit signals described above. Regardless of the switching arrangement utilized, however, indicator 35 is effective to provide an indication whenever the subject is closer than the minimum distance for which the optical system of the camera has been designed as well as whenever the subject is outside the range for which flash illumination will be proper when the camera is operated in its flash mode. Whenever an indication is provided, an inhibit signal is also provided for the purpose of preventing actuation of the shutter and for terminating the camera cycle.

FIG. 3 discloses another embodiment wherein the lens actuated too-close, too-far system is replaced by an indicator 35A, whose operation relies upon the contents of range counter 41 and does not depend upon physical movement of the lens mount. The camera of FIG. 3 is similar to that of FIG. 2 except for the modifications required to accommodate the indicator 35A. Advantageously, it should be noted that (as explained below) since lens movement is unnecessary in the second and third embodiments for indicating subject distance and/or inhibiting exposure etc., these embodiments (in contrast to the embodiment of FIG. 2) are suitable for flash subject distance in a fixed lens or so-called fixed focus cameras. Counter 41 is a typical binary counter, and for discussion purposes, the counter is shown in FIG. 4 as a 4-bit binary counter. It should be understood that in an actual camera, more bits would be used for the purpose of increasing the number of divisions into which the range of a subject can be divided. However, the principal of operation is the same.

Counter 41 is incremented by the output of scaled clock 63 in the manner described above. The states of counter 41 as a function of time and the output of the scaled clock are shown in FIG. 5. Associated with each state is both a position of the lens mount as described above as well as the range of a subject. That is to say, if counter 41 has the state 0011 when RECEIVE pulse 48 occurs, then the distance of the subject causing this pulse will be three feet (using the typical figures shown in FIG. 5). If it is assumed that the minimum distance for which the optical system of the camera is designed is four feet, then the state of counter 41 for a subject located less than the minimum distance from the camera can be any one of the four states contained within the legend "too near for flash with focus". Minimization of these states is the logical quantity $\overline{Q3} \cdot \overline{Q4}$, which is the logical operation carried out by an AND gate 90 (FIG. 6). This gate will have an output during the first three increments of counter 41. If a RECEIVE pulse 48 occurs during this time, then the conclusion is that the subject is closer to the camera than the minimum distance defined by plane 24 (FIG. 1).

As shown in FIG. 6, a latch 91 is set under these conditions causing illumination of lamp 84A indicating that the subject is too near for achieving focus under ambient lighting conditions, or too near for achieving proper exposure under flash illumination. The output of latch 91 passes through an OR gate 92 to produce a camera inhibit signal which disables gate 93 and prevents the delayed output of latch 65 from enabling gate 66 to operate the lens motor 32. In other words, the inhibit signal appears, in time, before the delayed output of latch 65 thereby preventing the motor 32 from being energized. As a consequence, the lens mount remains at its park position. In addition, the camera inhibit signal produced by OR gate 92 disables gate 39 to prevent the application of an input to the shutter actuator 69 and also actuates the multivibrator 70 to terminate the camera cycle. From the above, it can be seen that the camera cycle is terminated without any movement of the lens mount and without shutter actuation.

If the camera is in its flash mode of operation, and the subject is located at a distance greater than the maximum distance as given by plane 34 (FIG. 1), initiation of a camera cycle will cause the range counter 41 to have one of the five states included within the legend "too far for flash" shown in FIG. 5. Minimization of these states produces the logical quantity $Q4 \cdot (Q1 \cdot Q2 + Q3)$. This logic is carried out by indicator 35A as shown in FIG. 6. Specifically, the output of AND gate 95 will be indicative of a subject being located beyond plane 34. If AND gate 95 has an output when a RECEIVE pulse occurs, and the camera is in its flash mode, AND gate 96 would have an output which sets latch 97 illuminating lamp 88A. This lamp provides an indication that the subject is too far for achieving a proper exposure under flash illumination. Latch 97 also provides a camera inhibit signal as a consequence of OR gate 92, the inhibit signal serving to inhibit the enabling of gates 66 and 39 and to terminate the camera operation as described above.

The division of the output into the steps shown in FIG. 5 is entirely arbitrary. For example, the "usable range for ambient" could be larger or smaller than that shown and will depend upon the camera design. The size of the range "too near for flash" could be different from the range "too near for focus", this too being dependent on camera design, and the logic required for such other ranges will depend directly on the ranges actually used.

Figure 9:
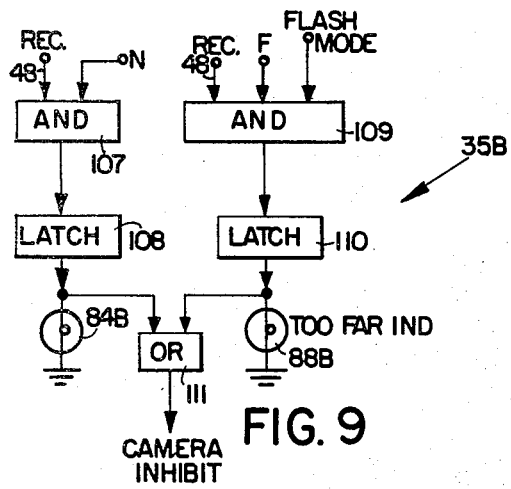
FIG. 9 is a logic diagram for producing too-near and too-far indications as well as the camera inhibit signal from the analog system of FIG. 8.

Alternative to indicator 35A, which operates on the output of range counter 41, an indicator according to the present invention can take the form shown at 35B in FIG. 9. In this embodiment, the operation of the indicator is based on a recognition that the time required for the output of the scaled clock to reach a number representative of the distance of the subject is dependent on the scale factor of the scale clock. Thus, timing independent of the scaled clock can be used for an indicator if the timing is synchronized with the scaled clock. A stable reference with respect to the operation of the scaled clock is a suitable starting point for timing. Such stable reference could be the depression of shutter release button 28 which is "start" as indicated in the timing diagram of FIG. 7. In such case, circuitry 100 shown in FIG. 8 will provide the necessary logical inputs to indicator 35B shown in FIG. 9.

Figure 7:
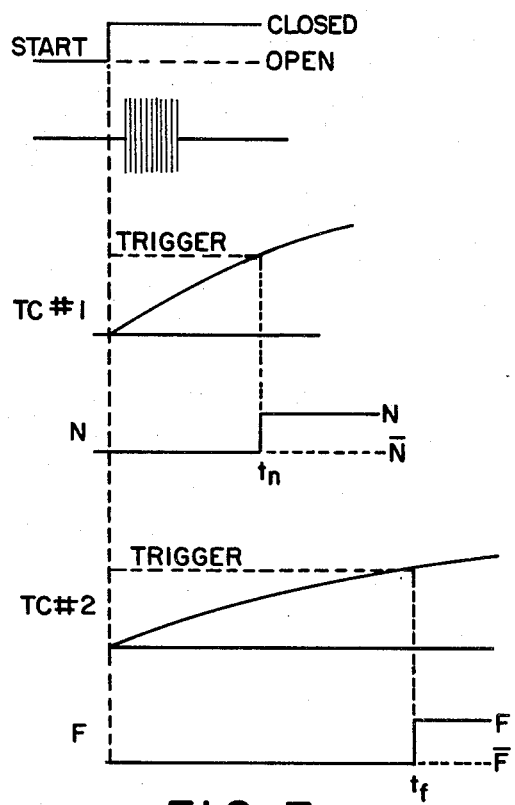
FIG. 7 shows timing diagrams associated with an analog embodiment of the indicating and inhibiting arrangement of FIG. 3.

Circuitry 100 comprises integration circuit 101 with a time constant of (R,C1), and integration circuit 102 with a time constant of (R,C2) which is larger than the time constant of circuit 101. The time rate of change of the output of these two integrators is illustrated in FIG. 7. After depression of shutter release button 28 which closes a start switch 103, the output of integrator 101 (shown at TC #1) will reach a trigger level at a time $t_N$ which will be prior to the time $t_F$ that the output of integrator 102 (shown at TC #2) reaches its trigger level. Each of the integrator circuits 101 and 102 include inverters, with circuit 101 having a single inverter 104 (whose output changes from N to $\overline{N}$ at the end of the interval between the closing of start switch 103 and $t_N$) with circuit 102 having a pair of inverters 104 and 105; the output of the latter changing from $\overline{F}$ to F at the end of the interval between switch closing and $t_F$.

By a suitable selection of the time constants for integrators 101 and 102, the time $t_N$ will correspond to the time required for the range counter 41 to accumulate pulses from the scaled clock indicative for a subject located at the minimum distance from the camera. Similarly, the time $t_F$ will be the time required for range counter 41 to accumulate pulses from the scaled clock corresponding to a subject located at the maximum distance from the camera.

Figure 8:
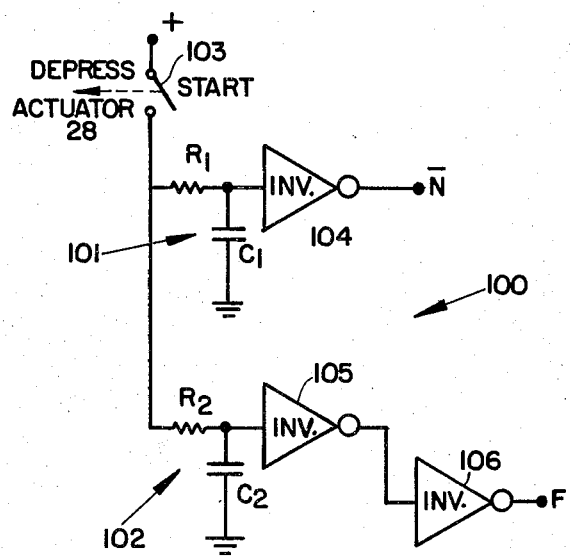
FIG. 8 is a typical block diagram for generating the analog voltages shown in FIG. 7.

Indicator 35B shown in FIG. 9 utilizes the logic signals developed by the circuitry shown in FIG. 8 as well as the logic signals representing the RECEIVE pulse 48 and the position of flash switch 31. Thus, if the RECEIVE pulse occurs before $t_N$ (corresponding to the too-close position), an AND gate 107 is enabled by the receive signal and N output of inverter 104. Hence, under these conditions, the gate 107 will have an output that will set a latch 108 illuminating an indicator lamp 84B and thereby providing an indication that the subject is too close to the camera for focusing or for achieving proper exposure under flash illumination. Similarly, in the flash mode (signalled by switch 31) if RECEIVE pulse 48 has not occured ($\overline{REC}$) before $t_F$ (corresponding to the too-far position), and AND gate 109 is enabled by the NOT receive signal, the flash mode signal, and the F output of inverter 106. Hence, under these conditions, the gate 109 will have an output that will set a latch 110 thereby illuminating a lamp 88B and providing an indication that the subject is beyond the maximum distance for proper exposure under flash illumination conditions.

As is the case of indicator 35A, indicator 35B produces an inhibit signal by means of an OR gate 111 whenever either of latches 108 or 110 is set. Such inhibit signal is used to disable gates 93 and 39 (FIG. 3) and to actuate the multivibrator 70.

Hence, the latch 108 is set, producing an indication and an inhibit condition if the RECEIVE signal 48 occurs before the $\overline{N}$ output of inverter 104 (before time $t_N$), while the latch 107 is set if the RECEIVE signal has not occurred before the output of inverter 106 has changed to F (after time $t_F$).

It is believed that the advantages in and improved results furnished by the method and apparatus of the present invention are apparent from the foregoing description of the various embodiments of the invention. Changes and modifications can be made without departing from the spirit and scope of the invention as sought to be defined in the claims that follow.

What is claimed is:

1. In a camera operable to record an image of a subject located within a given range of subject distance, the camera having a range finder for, in response to camera actuation, determining the distance to the subject, and a shutter arrangement for exposing an image of the subject on a recording medium, said range finder producing a train of pulses, whose total is related to subject distance, the improvement wherein said range finder produces a train of pulses such that one plurality of pulses is representative of subject distance located within said range and at least another plurality is representative of subject distance outside of said range, and additionally comprising means for indicating when the total number of pulses is within said other plurality to thereby indicate that said subject is outside of said range.

2. The camera of claim 1 wherein said improvement additionally includes means for inhibiting operation of the shutter arrangement when the total number of pulses is within said other plurality.

3. The camera of claim 1 wherein said means for indicating includes means for indicating when the total number of said pulses is within a first plurality representative of subject distance closer than a lower limit of said range and within a second plurality representative of subject distance farther than an upper limit of said range.

4. The camera of claim 1 wherein said means for indicating includes means for indicating when the total number of pulses is less than a given minimum number.

5. The camera of claim 4 wherein said given minimum number is representative of a subject at a minimum close up distance.

6. The camera of claim 1 wherein said means for indicating includes means for indicating when the total number of said pulses is greater than a given maximum number.

7. The camera of claim 6 wherein said given maximum number is representative of a subject at the maximum distance for flash exposure.

8. In a camera operable to record an image of a subject located within a given range of subject distance, the camera having a range finder for, in response to camera actuation, determining the distance to the subject, and a shutter arrangement for exposing an image of the subject on a recording medium, said range finder producing a train of pulses, whose total is related to subject distance, the improvement wherein said range finder produces a train of pulses such that one plurality of pulses is representative of subject distance located within said range and at least another plurality is representative of subject distance outside of said range, and additionally comprising means for inhibiting operation of said shutter arrangement when the total number of pulses is within said other plurality to thereby inhibit exposure operations when said subject is outside of said range.

9. The camera of claim 8 wherein said means for inhibiting includes means for inhibiting said shutter operation when the total number of said pulses is within a first plurality representative of a subject distance closer than a lower limit of said range and within a second plurality representative of subject distance farther than an upper limit of said range.

10. The camera of claim 8 wherein said means for inhibiting includes means for inhibiting operation of said shutter arrangement when the total number of pulses is less than a given minimum number.

11. The camera of claim 10 wherein said given minimum number is representative of a subject at a minimum close up distance.

12. The camera of claim 8 wherein said means for inhibiting includes means for inhibiting operation of said shutter arrangement when the total number of pulses is greater than a given maximum number.

13. The camera of claim 12 wherein said given maximum number is representative of a subject at the maximum distance for flash exposure.

14. In a camera operable to record an image of a subject located within a given range of subject distance, the camera having a range finder for, in response to camera actuation, determining the distance to the subject, and a shutter arrangement for exposing an image of the subject on a recording medium, the improvement wherein said range finder produces a range time interval whose length is in accordance with subject distance such that a range time interval within a time period of given minimum and maximum limits is representative of a subject distance located within said subject distance range and a range time interval outside of said given time period is representative of a subject distance outside of said subject distance range, and additionally comprising means for indicating when the range time interval produced by said range finder is outside of said given time period to thereby indicate when said subject is outside of said subject distance range.

15. The camera of claim 14 wherein said improvement additionally includes means for inhibiting operation of said shutter arrangement when the produced range time interval is outside of said given time period.

16. The camera of claim 14 wherein said means for indicating includes means for indicating when the duration of the produced range time interval is less than said minimum first time period limit and is thereby representative of subject distance closer than a lower limit of said subject distance range or greater than said maximum time period limit and is thereby representative of subject distance farther than an upper limit of said subject distance range.

17. The camera of claim 14 wherein said indicating means includes means for defining a first time period substantially equal to a range time interval representative of a subject located at a lower limit of said range and a second time period greater than said first and substantially equal to a range time interval representative of a subject located at an upper limit of said range, and said indicating means includes means for indicating when the produced range time interval is within either said first or said second time period.

18. The camera of claim 14 wherein said range finder transmits energy toward the subject and receives a reflected signal therefrom, and the time between the transmission and said reflected signal provides said range time interval.

19. The camera of claim 18 wherein said range finder is a sonic range finder.

20. In a camera operable to record an image of a subject located within a given range of subject distance, the camera having a range finder for, in response to camera actuation, determining the distance to the subject, and a shutter arrangement for exposing an image of the subject on a recording medium, the improvement wherein said range finder produces a range time interval whose length is in accordance with subject distance such that a range time interval within a time period of given minimum and maximum limits is representative of a subject distance located within said subject distance range and a range time interval outside of said given time period is representative of a subject distance outside of said subject distance range, and additionally comprising means for inhibiting operation of said shutter arrangement when the range time interval produced by said range finder is outside of said given time period to thereby inhibit exposure operations when said subject is outside of said subject distance range.

* * * * *